Figure 1:
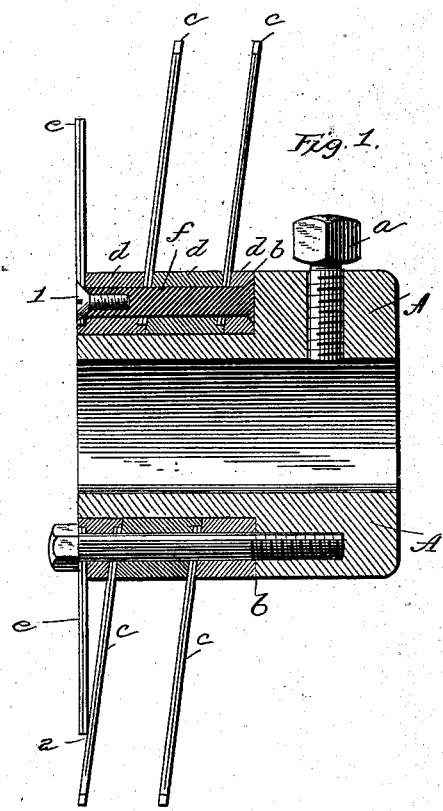

(No Model.)

W. R. FOX.
TENONING CUTTER.

No. 413,364. Patented Oct. 22, 1889.

Attest
Walters Donaldson
F. L. Middleton

Inventor
William R. Fox
by Ulis Spear
Atty.

UNITED STATES PATENT OFFICE.

WILLIAM R. FOX, OF GRAND RAPIDS, MICHIGAN.

TENONING-CUTTER.

SPECIFICATION forming part of Letters Patent No. 413,364, dated October 22, 1889.

Application filed October 9, 1888. Serial No. 287,669. (No model.)

*To all whom it may concern:*

Be it known that I, WILLIAM R. FOX, of Grand Rapids, in the county of Kent and State of Michigan, have invented a new and useful Improvement in Tenoning-Cutters; and I do hereby declare that the following is a full, clear, and exact description of the same.

The present invention is an improvement in tenoning-machines, and is an adaptation of the dado-cutters shown in the patent to J. R. Mentzer, No. 384,209, dated June 5, 1888, and that of myself, No. 384,248, dated June 12, 1888, to a tenoning-machine. In thus adapting the cutters shown in the said patents I omit the parallel outer saws, while retaining one or more inclined saws either stationary or removable, and upon one side of the head which carries the inclined saws I set, either stationary or removably, a saw of the same diameter as the inclined saws, but with the upper and lower portions of its periphery removed. In the patents referred to the outer saws were provided with cut-away portions, but these were simply to allow the inclined saw or saws to overlap, but in the present case this is the purpose in cutting away the saw at one side; but as in some cases a single vertical saw is used it is necessary in order to balance the head that the opposite side of the saw should be cut away in order to make it symmetrical and cause it to work smoothly. In the case of a cutter provided with stationary inclined saws and a single vertically-arranged saw the latter marks out the work or cuts a kerf of proper depth, while the inclined saws remove the material, so as to form one side of the tenon from the line of the kerf cut by the vertical saw to the edge of the material being tenoned. A similar saw is arranged beneath the wood, so as to cut away the under portion in the same manner, and thus make a complete tenon. When the saws are arranged for adjustment, so as to cut a narrower or wider tenon, I use the construction shown in my patent aforesaid, with the exception that I substitute for the vertical saw shown therein a vertical saw having a portion of the periphery cut away on opposite sides, for the purpose above described, and in case it is desired to cut off the end of the tenon to a determined length, in place of the second vertical saw shown in the patent, I substitute a saw which while being cut away at opposite points on its periphery, so as to make it of equal diameter with the first vertical saw, the diameter of the second saw from edge to edge of its cutting-surface exceeds the diameter of the inclined saws, and the effect of this is to gage the work by the first vertical saw, to remove the material by the inclined fixed or adjustable saws, and to cut off the end of the tenon by the second vertical saw. In this construction the upper and lower saws or heads are arranged one in advance of the other, so as not to interfere in their joint action upon the wood.

The invention consists, broadly, of a tenoning-cutter head composed of a supporting-head with a vertically-arranged saw for forming the shoulder of the tenon, having opposite portions of its periphery removed, and one or more inclined saws arranged in rear of said vertical saw for removing the material between the line cut by the vertical saw and the end of the material upon which the tenon is to be cut.

It further consists of a supporting-head with a vertically-arranged saw thereon, having opposite portions of its periphery removed, and inclined saws arranged at an angle to the vertical saw, said saws being adjustable to increase or diminish the capacity of the saw.

It consists, thirdly, of a suitable supporting-head, a vertically-arranged saw for marking the beginning of the work, inclined saws for removing the material to form the tenon, and a second vertically-arranged saw of greater diameter than the preceding saws adapted to cut off the end of the tenon.

It consists, finally, of a suitable supporting-head, a vertically-arranged saw having portions of its periphery removed, inclined saws arranged at an angle to the first saw, and a rear vertically-arranged saw of greater diameter in one direction than the inclined saws, the said saw having portions of its periphery removed opposite each other.

Figure 2:
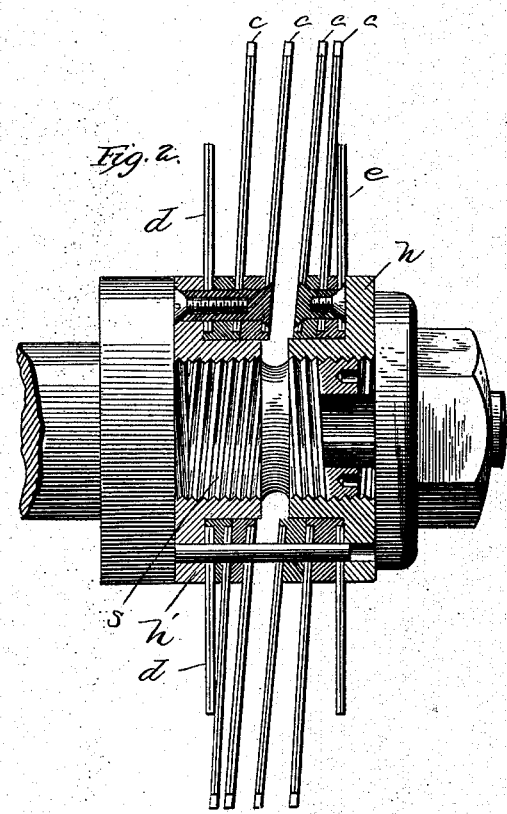
Figure 3:
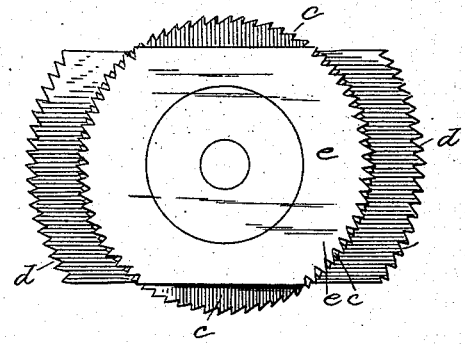
Figure 4:
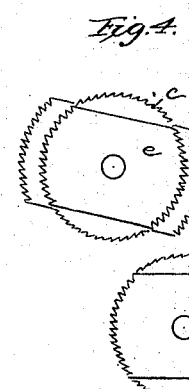

In the accompanying drawings, Figure 1 represents a head adapted for connection with the arbor of a tenoning-machine, showing the simplest form of my invention. Fig. 2 represents the arbor of a tenoning-machine carrying a cutter provided with adjustable cutting-saws, with an inner saw for cutting off the end of the tenon. Fig. 3 is a face view of Fig. 2. Fig. 4 represents the relative position of the pair of saws when the upper saw is adapted to cut off the end of the tenon.

I do not in the drawings deem it necessary to represent the operating parts of a tenoning-machine, as my invention, relating simply to the cutting-head, may be applied without material alteration to any machine now in use; or, if desired, a special machine may be provided for use of said cutter.

In Fig. 1 I have shown a head A, adapted for connection with the arbor of any tenoning-machine by means of a set-screw $a$. This head has a recess, as shown at $b$, formed in its upper periphery, extending to one end, and in this recess are supported two inclined saws $c\ c$, being held between collars $d$, having inclined faces corresponding to each other, so as to keep the saws parallel to each other. Three of these collars are shown, and the third one while inclined upon one face has its opposite face made vertical and provided with a shallow recess adapted to receive a saw $e$. Openings are made through the collars and saws at opposite points, and through one set a headed pin $f$ is placed, having a screw-threaded socket in its forward end, its headed end bearing against the rear wall of the recess formed in the head A. A screw 1 passes through an opening in the saws $e$ and enters the screw-threaded socket of the part $f$, thus securing the collars and saws firmly together. At a point opposite I pass a bolt through the saws and collars, screwing it firmly into a screw-threaded hole in the rear wall of the recess in the head A, thus securing the parts rigidly to the said head. The saws $c\ c$ are of equal diameter, and are circular; but the saw $e$ is cut away at the point 2 on its periphery to allow for the overlapping of one of the saws $c$, as shown. In order to allow for steady and uniform movement of the head, I find it desirable to cut away the periphery of the saw $e$, directly opposite the point 2, in a corresponding manner, and this serves to balance the head and to prevent irregular cutting. The diameter of the saw in the opposite direction is equal, however, to the diameter of the inclined saws taken vertically, and serves to mark the beginning of the work to form the tenon—that is, it cuts a vertical kerf and forms the shoulder of the tenon, while the inclined saws remove the material to the proper depth in rear of the said saw $e$. It will be understood that while I have shown two inclined saws one may be used or several.

In Fig. 2 I have shown a series of inclined saws, with outer vertical saws, the inclined saws being represented at $c\ c$, the outer vertical saw at $e$, and the inner vertical saw at $d$. This construction is similar to the cutter-head shown in my aforesaid patent, and consists of a right and left handed screw-threaded sleeve $s$, supporting corresponding screw-threaded collars $h$ and $h'$, which in turn carry a set of saws consisting of one or more inclined saws $c\ c\ c$ and a vertical saw $d$, and these sets of saws may be adjusted to increase or diminish the width of cut by operating the screw-threaded sleeve. The vertical saw $e$ is in all respects similar to the corresponding saw described in Fig. 1, and operates in the same manner. This head may be used with the saw $e$ and saws $c\ c$, if desired, without the vertical saw $d$; but in this case, as in the use of the form shown in Fig. 1, a separate saw would be required to cut off the end of the tenon; but by the use of the saw $d$, I provide in one cutter-head a construction which will not only cut the tenon, but cut off the end thereof to a determined length. This saw $d$ has a portion of its periphery removed upon one side to allow for the overlapping of one of the inclined saws, and I also remove a portion of the periphery upon the opposite side of this saw in order to balance the same and make its movement regular. The diameter of this saw, however, from edge to edge of its cutting-periphery exceeds that of the inclined saws, so that in the rotation of the head the cutting-periphery will penetrate into the thickness of the tenon and wholly or partially cut off the end of the tenon. When this saw is used, the lower head, which forms the under face of the tenon, is arranged slightly in advance or out of line with the upper head, so as not to interfere with the action thereof.

It will be understood that the saw $d$ may be made of such diameter as to cut entirely through the end of the tenon, and in this case the under head need not be provided with the duplicate of the saw $d$; but in case the saw $d$ cuts through only a portion of the end of the tenon, then the lower head must be provided with a similar saw to finish the cutting.

I claim as my invention—

1. In a cutter-head for tenoning-machines, a vertical saw for cutting the shoulder, having opposite portions of its periphery cut away, and a saw or saws arranged in rear of said vertical saw, substantially as described.

2. A cutter-head for tenoning-machines, consisting of a vertical saw for cutting the shoulder, said saw having opposite portions of its periphery cut away, and a series of inclined saws, said saws being adjustable in relation to each other to increase or diminish the width of cut, substantially as described.

3. A cutting-head for tenoning-machines, consisting of a vertical saw having opposite portions of its periphery cut away, inclined saws arranged in fixed relation thereto, and a second set of inclined saws, with means for adjusting the same, substantially as described.

4. A cutting-head for tenoning-machines, consisting of a vertical saw having opposite portions of its periphery removed, inclined saws in rear of the same, and a second vertical saw of greater diameter than the inclined saws and having opposite portions of its periphery cut away, substantially as described.

5. A cutting-head for tenoning-machines, consisting of a vertical saw $e$, two inclined saws or sets of saws $c$, adjustable in relation to the other, and a second vertical saw $d$, of greater diameter than the inclined saws, the saw $e$ being connected with one set of adjustable inclined saws and the saw $d$ with the other set of inclined adjustable saws, substantially as described.

In testimony whereof I have signed my name to this specification in the presence of two subscribing witnesses.

WILLIAM R. FOX.

Witnesses:
WILLARD F. KEENEY,
MARY B. CAMPBELL.